Nov. 26, 1968  G. A. KURKJIAN, JR  3,412,975
FABRICATED RESILIENT SEAL RETENTION FOR LARGE VALVE DAMPERS
Filed Sept. 6, 1966  2 Sheets-Sheet 1

Inventor:
Gregory A. Kurkjian, Jr.
By: Hofgren, Wegner, Allen,
Stellman & McCord
Attorneys

United States Patent Office 3,412,975
Patented Nov. 26, 1968

3,412,975
FABRICATED RESILIENT SEAL RETENTION FOR LARGE VALVE DAMPERS
Gregory A. Kurkjian, Jr., Lombard, Ill., assignor to Henry Pratt Company, a corporation of Illinois
Filed Sept. 6, 1966, Ser. No. 577,362
6 Claims. (Cl. 251—362)

This invention relates to valves and more particularly to an improved resilient seal retainer for valve structures.

In valves of the butterfly type, wherein a disc-like member is mounted for rotation in the interior of the valve body between an open position and a closed position spanning the inner periphery of the valve body, it is common for the resilient sealing member to be carried either in the periphery of the valve disc or to be positioned about the inner periphery of the valve body. Mounting of the resilient sealing member about the inner periphery of the valve body may be accomplished by suitably bonding the sealing member in a groove in the valve body or by clamping the resilient sealing member between a backing member and a movable retaining member in the desired position in the valve body.

This invention is directed to an improved structure for clamping a resilient valve seat in a valve body.

The primary object of this invention is to provide a new and improved seat retaining structure for a valve.

It is another object of this invention to provide a new and improved seat retaining structure for a valve wherein an adjustable camming member is provided for selectively moving the movable retaining member to obtain the desired seating relationship between the resilient valve member and the periphery of the valve closure member.

A further object of this invention is to provide a new and improved seat retaining structure for a valve wherein the valve seat abuts a backing member and is engaged by a movable retaining member and a rotatable adjustable cam member is provided, having a camming surface in engagement with the retaining member, to move the retaining member through an infinite number of seat adjusting positions, the cam member further including means for locking the retaining member and cam member in a desired adjusted position.

Other objects, features and advantages of the present invention will be apparent from the following description of the preferred embodiments illustrated in the accompanying drawings, in which.

Figure 1:
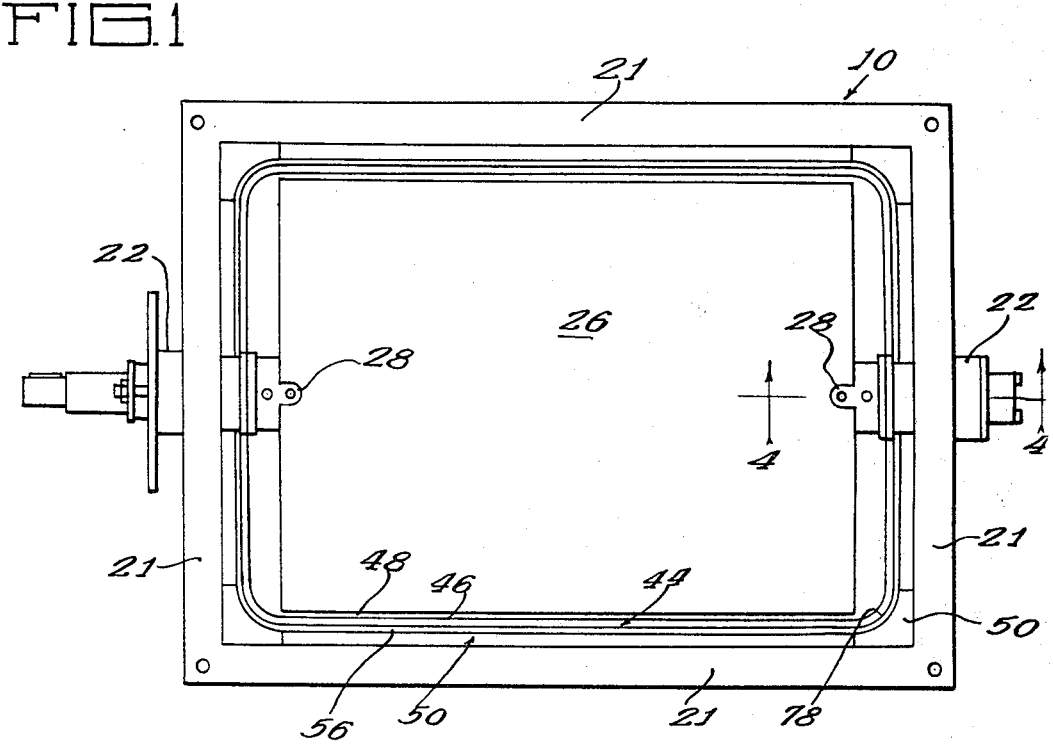
FIGURE 1 is a front elevational view of a damper-type valve utilizing the seat retaining structure of this invention.
Figure 2:
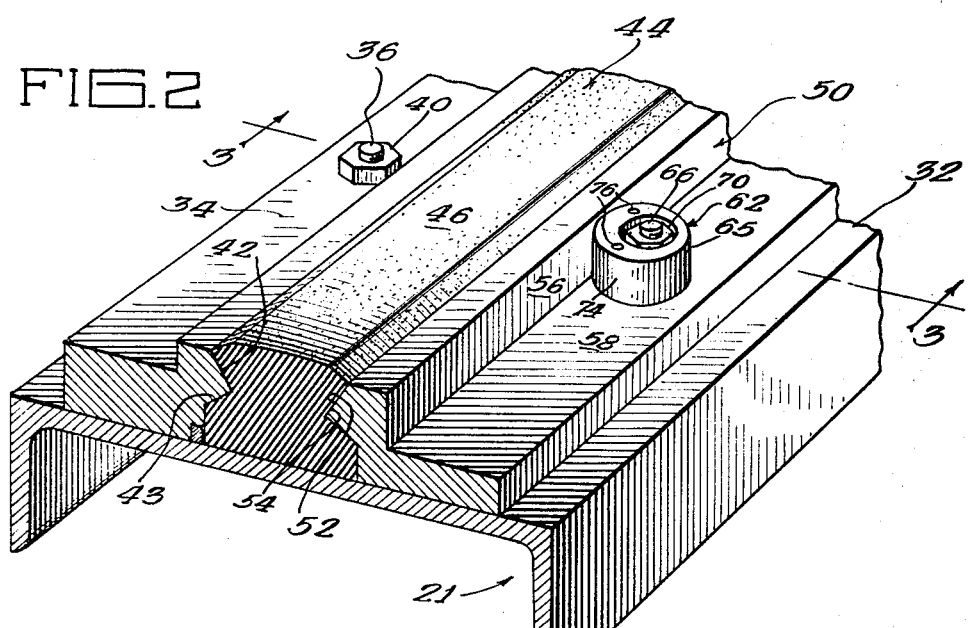
FIGURE 2 is a fragmentary enlarged isometric view of the seat retaining structure of this invention.
Figure 3:
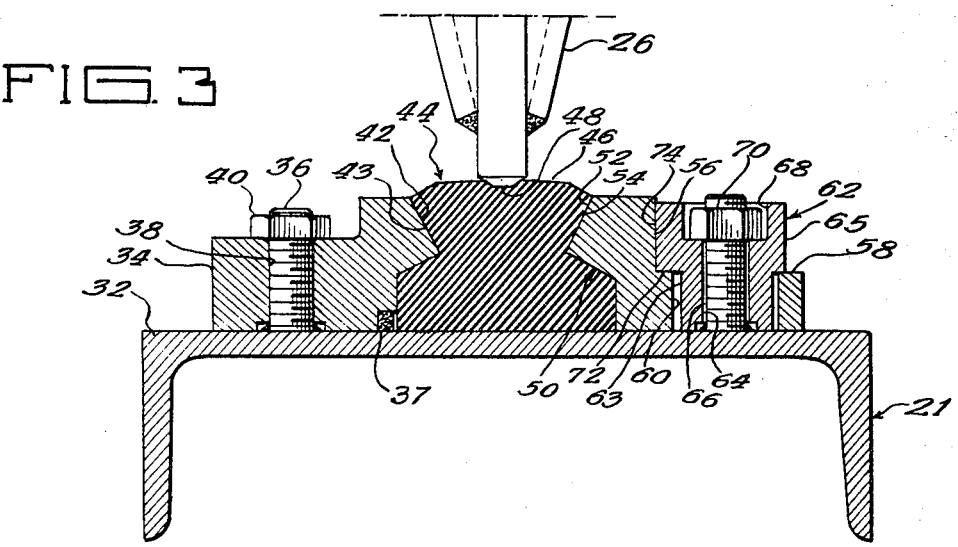
FIGURE 3 is a section view taken along the line 3—3 of FIGURE 2.
Figure 4:
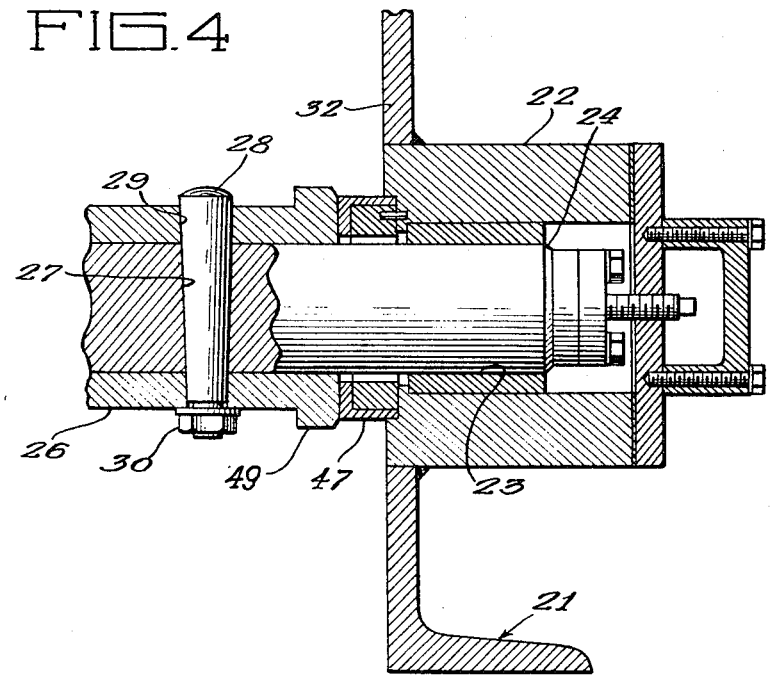
FIGURE 4 is a section view taken along the line 4—4 of FIGURE 1.

In FIGURE 1 there is shown a valve body 10 of the louver or damper type, generally suited to relatively low pressure applications, such as in regulating air flow for blast furnaces or the like. It is to be understood that the seating structure hereinafter shown and described may be utilized in other valve bodies for uses under conditions other than those specifically described herein.

The body 10 includes a rectangular frame 21 preferably made of channel iron. The frame mounts opposed trunnions 22 having suitable bearing surfaces 23 for rotatably mounting a shaft 24 in the frame. The shafts, in turn, mount a rotary valve closure member, disc, or louver blade 26 for movement between an open position permitting the free flow of fluid through the valve body, and a closed position as shown in FIGURE 1, wherein the louver 26 is in sealing engagement with the inner periphery of the valve body 10 thereby blocking flow of fluid through the valve. Each shaft 24 has a transverse through opening 27 for receiving tapered pin 28 which also extends through aligned openings 29 in louver 26. Nut 30 is threade on one end of pin 28 to mount the louver on the shaft.

The channel iron frame 21 provides a flat, elongate, inwardly facing surface 32 on which the several components of the seat retaining structure of this invention may be positioned. A first or backing member 34 is fixed to the surface 32 by means of stud 36 which extends through opening 38 in backing member 34 and nut 40 which is threaded on stud 36. This backing member 34 has a backing surface 42 generally mating with face 43 of the resilient valve seat 44.

Valve seat 44 has a top or seating surface 46 which is intended for sealing engagement with the periphery 48 of closure member or louver 26 when the louver is in the closed position to prevent the flow of fluid through the valve body. This invention is directed to an improved means for retaining and/or distorting the resilient seat to insure proper seating engagement between surfaces 46 and 48.

The seat retaining structure further includes a plurality of movable retaining members 50, each a few inches long and having a forward seat engaging surface 52 generally mating with the adjacent face 54 of the resilient member 44. Each member 50 has an upright shoulder 56 spaced from surface 52 and a flat face or a second or locking surface 58 generally parallel to surface 32 of the channel frame and generally normal to shoulder 56. Each member 50 has at least two longitudinally spaced oval bores 60 extending through from surface 58 to the underside of the member.

Camming members 62 are mounted on the retaining members 50 with reduced shank portion 63 of each camming member extending through each opening 60. The shank 63 is reduced in lateral dimension relative to the narrow dimension of the opening 60 to permit movement of retaining member toward and away from resilient sealing member 44 relative to valve frame. Each camming member 62 is also provided with a bore and an eccentrically positioned enlarged head 65. A stud 66 is secured, such as by welding, to the surface 32 for rotatably mounting the camming member.

Head 65 of the camming member has an enlarged countersunk opening 68 for receiving a lock nut 70 which may be threaded on stud 66 to hold the camming member and the retaining member 50 in selected adjusted positions as will be explained later. An annular shoulder 72, formed between head 65 and shank 63, is in facial engagement with the surface 58 of retaining member 50.

The outer periphery 74 of the head of the camming member bears against surface 56 of the retaining member 50 to urge the retaining member against the resilient seal as the camming member 62 is rotated about its eccentric axis with respect to stud 66. To assist in rotating the cam member 62, a pair of openings 76 may be formed in the upper surface of the head to receive a spanning wrench or similar tool.

In operation, when it is desired to adjust the resilient seat 44 so that surface 46 will be in intimate engagement with periphery 48 of louver 26, nut 70 on stud 64 is first loosened permitting free rotational movement of cam member 62 relative to the stud and retaining member 50. The cam member is then rotated about its eccentric axis to move the retaining member 50 relative to resilient seat 44. When the cam member has been rotated to a point wherein the resilient seal 44 is suitably expanded toward the closure so that the proper seating engagement exists between periphery 48 and seating surface 46, nut 70 is tightened on stud 66, which has the effect of locking the cam against further rotation and which further locks the retaining member 50 against movement relative to frame 21 or cam 62 by means of the frictional engagement between annular shoulder 72 and surface 58 of retaining member 50. Should adjustments be needed after extended use of the valve, the above procedure is repeated.

It is to be understood that retaining member 50 may be formed in adjacent segments about the inner periphery afforded by channel 21 to provide a plurality of individually adjustable segments about the extent of resilient sealing member 44. In the corner areas 78, the configuration of the retaining ring 50' may be formed as a quadrant of a circle to provide the desired rounded corner sealing surface.

While the seat disclosed is in a fabricated valve housing of channel iron cross section, many large valves are fabricated of plates welded together wherein the seat assembly is equally useable. Shapes other than basically rectangular are used, such as obround, square and round wherein the seat assembly may be used. The back-up member 34 may be welded in place if desired. Generally a static seal 37 is provided at the base juncture of the member 34 and the valve body so as to prevent flow or seepage behind the resilient seat. In whatever outline shape chosen for use of the seat assembly, the resilient ring is continuous from hub to hub where it abuts the sealing ring 47 about the shaft. A hub ring part 49 moves with the damper against the shaft seal ring 47. When first assembled, the hub ring will be in contact but the resilient seal will not contact the edge of the damper 26 until after it is squeezed and tightened in assembly. Slight extrusion in the seat ring brings the ring and damper edge into proper interference from hub to hub on both sides of the center shaft. Curved segments with at least two adjusting cams are used in the corners similarly as straight segments are used along the straight edges of the damper.

This invention provides an improved means for adjustably retaining a valve seat in a fabricated valve body. Through the simple steps of loosening a lock nut and rotating a camming member and then tightening the lock nut, the seating surface of the resilient member may be adjusted and both the cam member and the movable retaining member may be locked in the adjusted position. The structure of the invention is relatively simple which lends to its reliability of operation and ease of use.

The foregoing detailed description has been given for clearness of understanding only, and no unnecessary limitations should be understood therefrom, as some modifications may be obvious to those skilled in the art.

I claim:

1. A valve seat retention structure for use in a valve body having a through passage, a resilient sealing member positioned about the inner periphery of the passage and a backing member fixed to the body and abutting one side of the resilient sealing member, comprising: a retaining member mounted on the valve body adjacent the other side of the resilient sealing member for movement toward and away from the resilient sealing member, said retaining member having a first surface for receiving forces from one direction to move the retaining member towards and away from the resilient sealing member, said retaining member further having a locking surface for receiving forces from another direction for locking the retaining member against movement relative to the valve body and the resilient sealing member; a camming member in the valve body adjacent the retaining member having a first camming surface in abutting relation to the first surface of the retaining member for moving the retaining member responsive to movement of the camming member, said camming member having a second locking surface adjacent the retaining member locking surface, said camming member being mounted to the valve body for rotation relative to the retaining member and also for movement toward and away from the retaining member locking surface between an unlocked position and a locked position; and locking means for locking the camming member and retaining member in selected adjusted positions.

2. The apparatus of claim 1 wherein the retaining member has an enlarged opening; the valve body has a stud which projects through the opening, and the camming member has a shank portion extending through the retaining member opening with an eccentric bore through the camming member for telescoping the camming member over the stud.

3. The apparatus of claim 2 wherein the camming member has a first enlarged portion exteriorly of the opening in the retaining member on which the first cam surface is provided and a second reduced shank portion which extends into the opening in the retaining member, the shank portion having a reduced dimension relative to the opening permitting lateral movement between the retaining member and the camming member.

4. The apparatus specified in claim 3 wherein the retaining member first surface is the wall of a recess in the retaining member, said wall being generally coextensive with the resilient member, so that movement of the camming member moves the retaining member toward and away from the resilient member.

5. The apparatus as specified in claim 4 wherein the locking surface is the bottom wall of the retaining member recess which engages the underside of the camming member between the enlarged and reduced portions.

6. The apparatus of claim 5 wherein the stud is a threaded member, the bore in the camming member is larger than the dimension of the stud to permit free rotation of the camming member relative to the stud, said camming member bore being enlarged at the enlarged end of the camming member; and wherein a nut is threaded on the stud in the enlarged bore to provide a means for locking the camming member and retaining member by tightening the nut to cause the underside of the camming member to engage the bottom of the retaining member recess and thereby lock the camming member against further rotation and lock the retaining member against further movement.

References Cited

UNITED STATES PATENTS

| | | | |
|---|---|---|---|
| 2,894,718 | 7/1959 | Englert | 251—332 XR |
| 2,991,043 | 7/1961 | Saat | 251—364 XR |
| 3,144,040 | 8/1964 | White | 251—307 XR |
| 3,171,429 | 3/1965 | Sturmer et al. | 251—163 XR |
| 3,197,174 | 7/1965 | Killian | 251—362 XR |
| 3,301,523 | 1/1967 | Lowrey | 251—332 XR |
| 3,335,999 | 8/1967 | Lourey | 251—362 XR |

SAMUEL SCOTT, *Primary Examiner.*